United States Patent
Deliz Centeno

(10) Patent No.: US 11,867,917 B2
(45) Date of Patent: Jan. 9, 2024

(54) SMALL FIELD OF VIEW DISPLAY MITIGATION USING VIRTUAL OBJECT DISPLAY CHARACTERISTICS

(71) Applicant: APPLE INC., Cupertino, CA (US)

(72) Inventor: Luis R. Deliz Centeno, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/752,035

(22) Filed: May 24, 2022

(65) Prior Publication Data

US 2023/0185099 A1 Jun. 15, 2023

Related U.S. Application Data

(63) Continuation of application No. 16/942,939, filed on Jul. 30, 2020, now Pat. No. 11,372,253.

(60) Provisional application No. 62/886,535, filed on Aug. 14, 2019.

(51) Int. Cl.
*G02B 27/00* (2006.01)
*G02B 27/01* (2006.01)

(52) U.S. Cl.
CPC ..... *G02B 27/0179* (2013.01); *G02B 27/0172* (2013.01); *G02B 2027/0123* (2013.01); *G02B 2027/0141* (2013.01); *G02B 2027/0181* (2013.01)

(58) Field of Classification Search
None
See application file for complete search history.

(56) References Cited

U.S. PATENT DOCUMENTS

| | | | |
|---|---|---|---|
| 8,337,306 B2 | 12/2012 | Larsen et al. | |
| 9,904,055 B2 | 2/2018 | Burns et al. | |
| 10,447,966 B2 | 10/2019 | Ritchey et al. | |
| 10,878,620 B2 | 12/2020 | Schwab et al. | |
| 10,955,914 B2 | 3/2021 | Burns et al. | |
| 2010/0302247 A1 | 12/2010 | Perez | |
| 2016/0162742 A1* | 6/2016 | Rogan | G01S 7/4808 382/103 |
| 2017/0039731 A1* | 2/2017 | Liu | G06T 7/60 |
| 2020/0038112 A1 | 2/2020 | Amanatullah et al. | |

FOREIGN PATENT DOCUMENTS

| | | |
|---|---|---|
| EP | 3336805 | 6/2018 |
| WO | 2014/182545 | 11/2014 |

* cited by examiner

*Primary Examiner* — Martin Mushambo
(74) *Attorney, Agent, or Firm* — Thompson Hine LLP

(57) ABSTRACT

Various implementations disclosed herein include devices, systems, and methods that enable improved display of virtual content in computer generated reality (CGR) environments. In some implementations, the CGR environment is provided at an electronic device based on a field of view (FOV) of the device and a position of virtual content within the FOV. A display characteristic of the virtual object is adjusted to minimize or negate any adverse effects of the virtual object or a portion of the virtual object falling outside of the FOV of the electronic device.

20 Claims, 6 Drawing Sheets

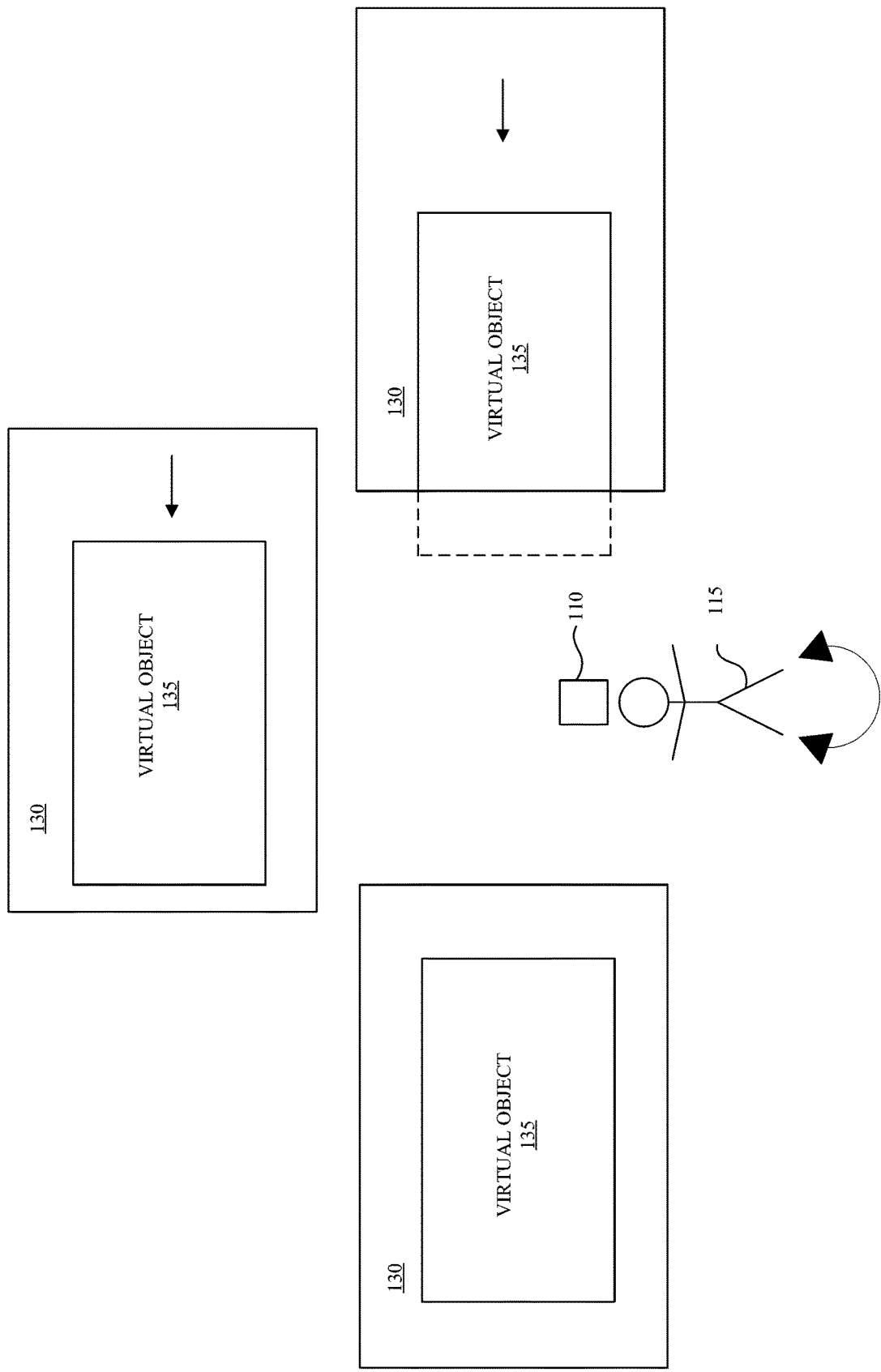

SMALL FIELD OF VIEW DISPLAY MITIGATION USING VIRTUAL OBJECT DISPLAY CHARACTERISTICS

CROSS-REFERENCE TO RELATED APPLICATIONS

This Application is a continuation of U.S. patent application Ser. No. 16/942,939 filed Jul. 30, 2020, which claims the benefit of U.S. Provisional Application Ser. No. 62/886,535 filed Aug. 14, 2019, each of which is incorporated herein by this reference in its entirety.

TECHNICAL FIELD

The present disclosure generally relates to electronic devices, and in particular, to systems, methods, and devices for computer generated reality environments that display virtual content.

BACKGROUND

Virtual content may be difficult to view at peripheral portions of a display. For example, the virtual content may be clipped or cut-off as the virtual content approaches a peripheral edge of the display. In the case of an optical see-through display, the limited dynamic range of the transparent display may make seeing or understanding the virtual content difficult at the limits of the optical see-through display's field of view (e.g., inactive border regions of the display). For example, virtual content may be difficult to view in circumstances where the optical see-through display has a small or narrow field of view.

SUMMARY

Various implementations disclosed herein include devices, systems, and methods for providing computer generated reality (CGR) content that include adjusting a display characteristic of a virtual object as it approaches a periphery of a field of view (FOV). In various implementations in an optical see-through device, rather than allowing visuals that are outside of the FOV of the device to be "clipped" (e.g., a portion of a virtual object that is outside of the FOV may appear to be missing or cut off), visuals have behaviors that are aware of the FOV of the device. For example, by presenting "transition-in" and "transition-out" behaviors as the visuals approach the FOV limit (e.g., scaling in/out, fading in/out, app logo to application launch, application sleep to wake, polygon flipping, materialization/dematerialization, etc.), the visuals never reach the peripheral edges of the FOV and the edges of the FOV are hidden from the user.

In some implementations, virtual content (e.g., one or more virtual objects) is adjusted (e.g., scaled down in size) to avoid clipping off a portion of the virtual content that is outside of the current FOV. In some implementations, a position (e.g., on a wall) and a display characteristic (e.g., full size) are identified for a virtual object in a CGR environment. For example, a virtual television (TV) may be displayed full-size and centered on a wall based on a desired location in three-dimensional (3D) world space and its size/shape characteristics. In other implementations, a positional relationship of the virtual object to the FOV may be determined. For example, the edge of the virtual TV may be 10 pixels from the edge of the FOV.

Moreover, in some implementations, an FOV corresponding to a view of the CGR environment is determined from a viewpoint. Moreover, it may be determined that the FOV will provide a clipped appearance of the virtual object (e.g., a first portion of the virtual object within the FOV and a second portion of the virtual object outside of the FOV) based on the position and the display characteristic. For example, it may be determined that an edge of the FOV will intersect the virtual object by comparing a boundary of the virtual object to the FOV (e.g., the FOV will clip off the left 10 inches of the virtual TV). In some implementations, the FOV is determined based on a property of the display. Moreover, in some implementations, the FOV is determined based on a movement of a user or device. For example, the FOV may shift as a user rotates the device.

In some implementations, the display characteristic of the virtual object is adjusted based on the FOV and the view of the CGR environment is provided with the virtual object displayed according to the adjusted display characteristic. For example, the virtual TV may be scaled smaller so that it fits entirely within the FOV of the display or the virtual TV may be displayed as an icon/app logo rather than the virtual TV. Moreover, an edge of the virtual TV may be anchored to the edge of the FOV, the edge of the virtual TV may be dematerialized, or polygon flipping of the edge of the virtual TV may be performed for the portion of the virtual TV that would fall outside of the periphery of the FOV of the display.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2 illustrates the CGR experience provided by FIG. 1 in which a field of view (FOV) of the electronic device is shifted as the electronic device is rotated.

Figure 1:
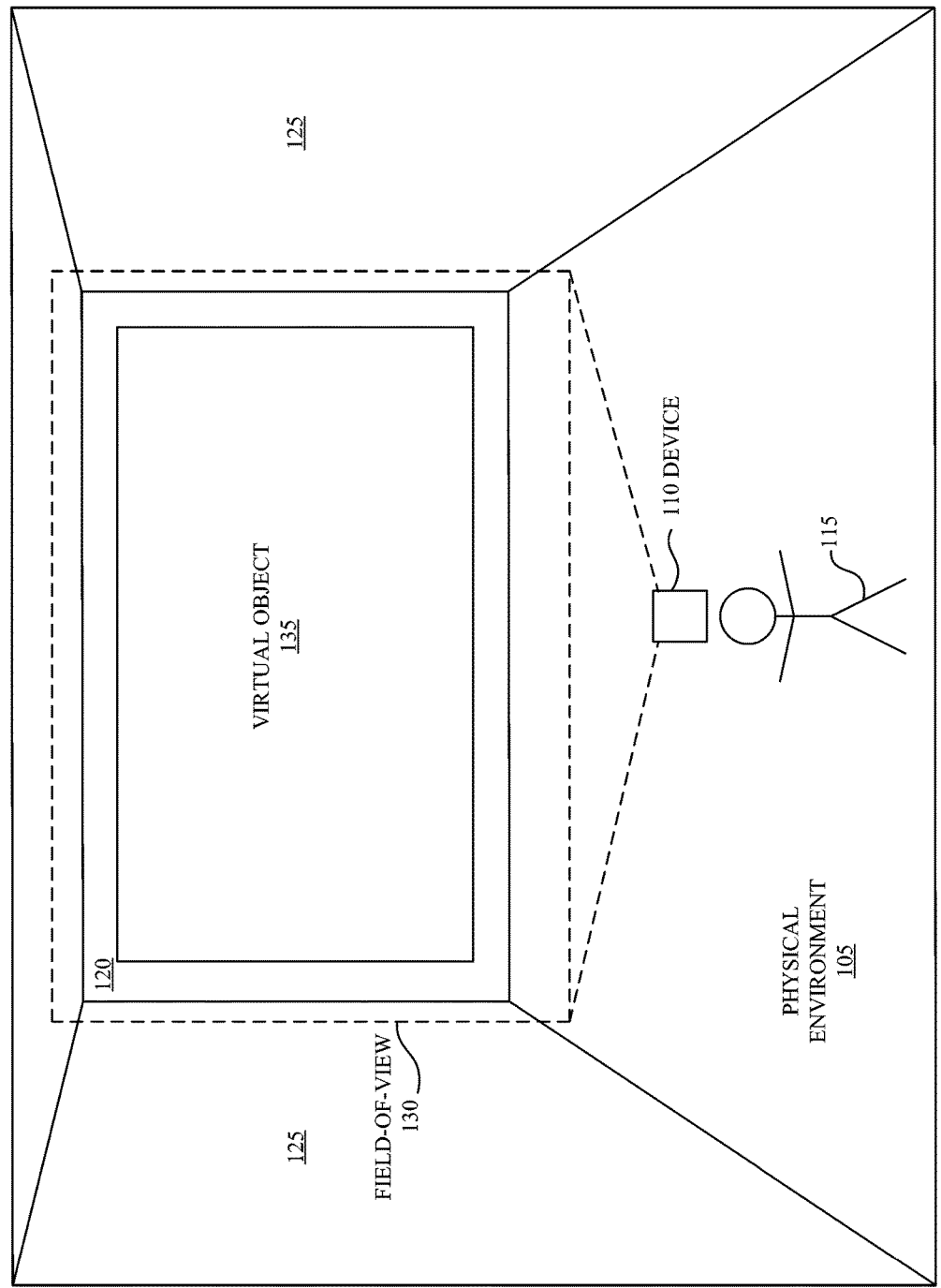
FIG. 1 illustrates a computer-generated reality (CGR) experience of a physical environment provided on a display of an electronic device in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Field of view (FOV): The FOV for an electronic device describes the angular extent of the electronic device, that is, the amount of a given scene that is viewable to a user of the electronic device. The human eye has a 180-degree FOV, and typically the images projected on displays of electronic devices only show a much smaller FOV. This is largely due to the limitations of the lenses that are used to record the image. Various implementations of the present invention, as will be described below, provide mechanisms for enhancing display of virtual content, particularly at the periphery edges of the FOV of an electronic device.

Referring to FIG. 1, an example operating environment 100 is illustrated in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a device 110 (e.g., a handheld device or a head mounted device (HMD) that provides an optical see through content). The device 110 may include an integrated controller or may be in communication with a separate controller, one or both of which may be in a physical environment 105. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the device 110 is configured to manage, coordinate, and, present a computer-generated reality (CGR) environment to the user. In some implementations, the device 110 includes a suitable combination of software, firmware, or hardware. The device 110 is described in greater detail below with respect to FIG. 4. In some implementations, a controller of the device 110 is a computing device that is local or remote relative to the physical environment 105. In some implementations, the functionalities of the controller of the device 110 are provided by or combined with the device 110, for example, in the case of a device that functions as a stand-alone unit.

In one example, a controller of the device 110 is a local server located within the physical environment 105. In another example, the controller of the device 110 is a remote server located outside of the physical environment 105 (e.g., a cloud server, central server, etc.). In some implementations, the controller of the device 110 is communicatively coupled with the device 110 via one or more wired or wireless communication channels (e.g., BLUETOOTH, IEEE 802.11x, IEEE 802.16x, IEEE 802.3x, etc.).

According to some implementations, the device 110 presents a CGR environment to the user while the user is present within the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, the device 110 receives image data, detects the physical environment 105, and identifies features of the physical environment 105 (e.g., a front wall 120 or side walls 125). Moreover, the device 110 may present a user 115 with an FOV 130 of a CGR environment. In some implementations, the FOV 130 may be determined based on hardware limitations and specifications of the device 110, a viewpoint of the user 115 within the physical environment 105, a movement of the user 115 within the physical environment 105, etc. Accordingly, dependent upon the FOV 130, the physical features of the physical environment 105 may or may not be captured within the FOV 130 of the device 110.

In some implementations, the device 110 presents the user with a virtual object 135 within the FOV 130. For example, the device 110 may present the user 115 with a virtual television (TV). In some implementations, the device 110 or user 115 may identify a position for the virtual object 135 relative to the physical environment 105 or the CGR environment. For example, the virtual TV may be positioned at a center of front wall 130. In some implementations, a display characteristic is applied to the virtual object 135. For example, a display characteristic of sizing (e.g., full-size) may be applied to the virtual TV. In another example, the sizing display characteristic of the virtual object 135 may be scaled based on the dimensions of the front wall 130 (e.g., covering the entirety of the front wall 130). Accordingly, the virtual object 135 may be associated with a desired location in the 3D world space, as well as its size/shape characteristics.

In some implementations, the virtual object 135 may appear to the user 115 to be fixed in space in the physical environment 105 at some distance in front of the user 115.

As shown in FIG. 1, the virtual object 135 (e.g., a projection of a virtual TV) may appear to the user 115 to be fixed at some distance in front of the user 115 (e.g., a few meters, or even appearing as a giant virtual TV filling front wall 130). In some implementations, the virtual object 135 may be partially transparent so that the user 115 may view the scene behind the virtual object 135. Moreover, virtual object 135 may include, but is not limited to, various display windows (e.g., directories, browsers, web pages, productivity tools (e.g., word processors), email applications or email messages, messaging applications, game windows, video (e.g., video from a video streaming application), text, animations, etc. While implementations are described as displaying virtual object 135 from device 110, content from other sources, for example from an external (e.g., network-based) source, may instead or also be displayed.

Referring to FIG. 2, a CGR experience provided by FIG. 1 is illustrated in which an FOV 130 of the device 110 (e.g., a handheld device or an HMD that provides optical see through content) is shifted as the device 110 is rotated. In some implementations, the virtual object 135 is advantageously anchored in the physical environment 105 in a non-movable manner and is connected to the movable representation in the FOV 130 by way of a dynamic connection. For example, as shown in FIG. 2, an anchored virtual object 135 may be displayed in the CGR environment that is anchored to a real-world direction or real-world location (e.g., opposing wall 120) so that the virtual object 135 may more closely approximate the appearance of a real-world object. As the user 115 and device 110 move (e.g., rotate) in the physical environment 105, the FOV 130 may move with the user 115 or device 110 (e.g., relative to the change in viewpoint of the handheld device or HMD), but the anchored virtual object 135 remains fixed relative to the physical environment 105. As shown in FIG. 2, the virtual object 135 may move towards the periphery of the FOV 130 as the viewpoint of the device 110 changes relative to a fixed position of the virtual object 135. For example, a virtual TV may move towards an edge of an FOV of a handheld device or an HMD as a user rotates the device relative to the physical environment, and anchored position of the virtual TV.

In some implementations, the device 110 determines the FOV 130 will provide a clipped appearance of the virtual object 135 based on the position and the display characteristic of the virtual object 135. For example, the device 110 may compare a boundary of the virtual object 135 to the FOV 130 to determine that a first portion of the virtual object 135 will be within the FOV 130 and a second portion of the virtual object 135 will be outside of the FOV 130 (e.g., an edge of the FOV 130 will intersect the virtual object 135).

Figure 3A:
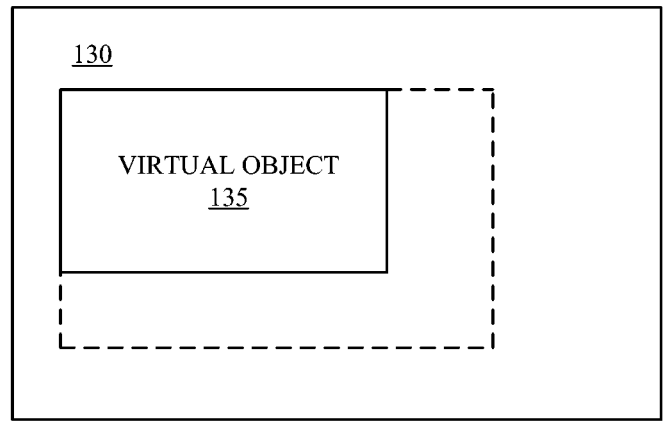
FIG. 3A illustrates the display of a virtual object according to an adjusted display characteristic where the virtual object is minimized to fit within the FOV of the display in accordance with some implementations.

In some implementations, in order to reduce the impact of or prevent clipping of the virtual object 135, a display characteristic of the virtual object 135 is adjusted based on the FOV 130. For example, as the virtual object 135 approaches the limits of the FOV 130, the virtual object 135 may exhibit a "transition-in" or "transition-out" behavior that prevents the virtual object 135 from reaching the edge of the FOV 130, e.g., hiding the edges of the display to the user. As illustrated in FIG. 3A, in one implementation, the display characteristic (e.g., sizing) is adjusted so that the virtual object 135 fits entirely within the FOV 130. For example, as a user turns the device from facing a virtual TV to the right, the virtual TV may be reduced in size to prevent clipping (e.g., continue to fit within the FOV 130 of the display) of the left side of the virtual TV. In another example, the virtual TV may be reduced to a threshold size and locked into the FOV 130 of the display (e.g., as an HUD).

Figure 3B:
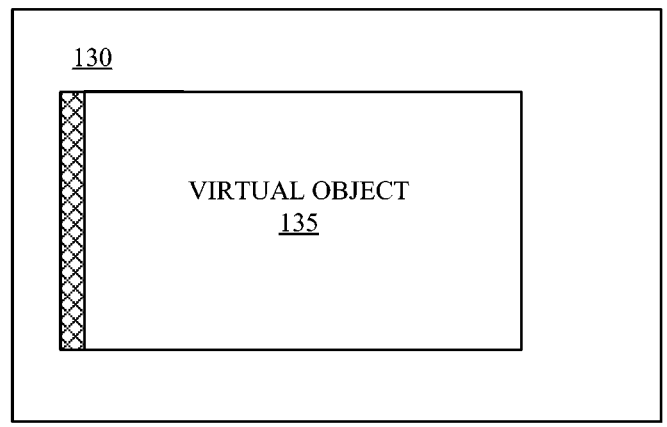
FIG. 3B illustrates the display of a virtual object according to adjusted display characteristics where an edge of the virtual object is adjusted in accordance with some implementations.

As illustrated in FIG. 3B, in another implementation, the display characteristic (e.g., brightness, luminance, color, transparency, etc.) of the virtual object 135 is adjusted (e.g., dematerialized) to reduce the perception of clipping of an edge of the virtual object 135. For example, the display characteristic (e.g., sizing) of the virtual object 135 may be adjusted as the virtual object 135 nears or approaches one or more edges of the FOV 130.

Figure 3C:
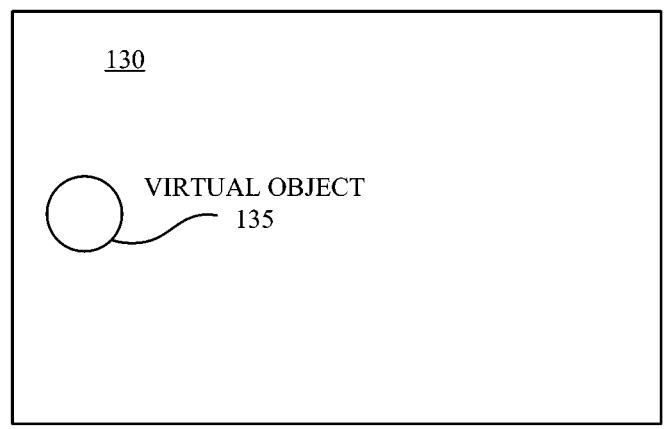
FIG. 3C illustrates the display of a virtual object according to adjusted display characteristics where a state of the virtual object is changed in accordance with some implementations.

As illustrated in FIG. 3C, in another implementation, the display characteristic (e.g., state or representation) of the virtual object 135 is adjusted. For example, a virtual TV may change from a screen to an icon or app logo. For example, the state of the virtual object 135 may change as the virtual object 135 nears or approaches one or more edges of the FOV 130. Moreover, in either a first state or a second state, virtual object 135 may be anchored to a position relative to the FOV 135 or physical environment 105.

In some implementations, the display characteristic is altered contemporaneously with determining the FOV 130 will provide a clipped appearance of the virtual object 135. For example, the display characteristic may be altered as the user 115 turns the device, prior at the virtual object 135 being clipped or cut-off. In some implementations, the display characteristic is selected for alteration based on criteria, e.g., based user settings or properties of the virtual object 135. For example, a virtual TV may have an associated property value specifying the TV be reduced in size if it is actively presenting a video, or may be displayed as an icon if the virtual TV is inactive.

In some implementations, particular virtual objects or relative positions within the FOV 130 are selectively adjusted, e.g., based on spatial discrimination. In some implementations, the display characteristic of a first virtual object depicted may be altered and the display characteristics of a second virtual object may not be altered, or may be altered differently, based on object altering selection criteria.

In some implementations, an identification by the device 110 that the FOV 130 will provide a clipped appearance of the virtual object 135 or the adjustment of the visual characteristic is based on identifying whether the FOV 130 satisfies movement criteria. For example, movement of the FOV 130 relative to the physical environment 105 or position of the virtual object 135 may be determined using a vector motion map (e.g., to identify relative motion of the FOV 130 or the virtual object 135). In another example, a vector motion map is used to estimate speeds at which the FOV 130 is moving or accelerations at which the FOV 130 is accelerating, and the speed or accelerations may be used to identify when or if the FOV 130 will provide a clipped appearance of the virtual object 135.

In some implementations, a view is provided of the CGR environment that includes display of the virtual object 135 according to the adjusted display characteristic. As illustrated in FIGS. 3A-3C, the virtual object may be presented based on one or more altered display characteristics (e.g., size, shape, translucency, dematerialization, visual effects, change of state, etc.). For example, this may involve displaying a virtual TV in a smaller form, with one edge dematerialized, or as an app or icon, where the change in the display of the virtual TV is based on the altered display characteristic.

In some implementations, the user 115 provides a preference or other input to control how much one or more display characteristics are altered to account for physical movement or vibration. For example, a user 115 that is walking (e.g., as opposed to resting) may wish for recognition of the clipped appearance of the virtual object 135 or adjustment of the display characteristic of the virtual object 135 to be less sensitive in order to prevent excessive changing of the virtual object 135. In another implementation, a delay or persistence criteria must be satisfied prior to displaying the virtual object 135 with the adjusted display characteristic, preventing rapid changing of the virtual object 135. Individual users may be relatively more or less perceptive of, or otherwise concerned with, the frequency of changes to the virtual object 135 and thus some users may opt for more frequent changes to the display of the virtual object 135 than other users.

Figure 4:
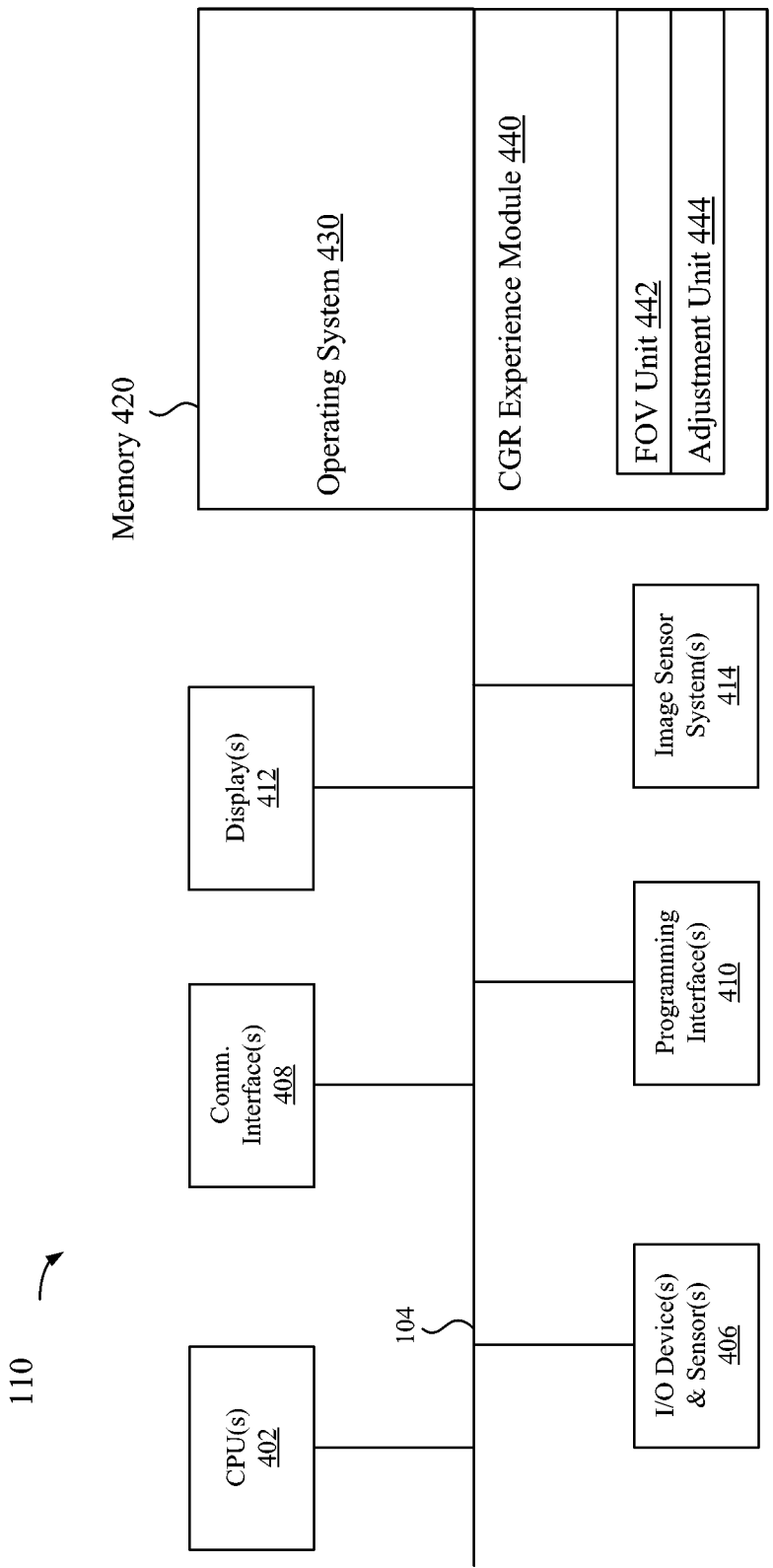
FIG. 4 is a block diagram of an example device in accordance with some implementations.

FIG. 4 is a block diagram of an example of the device 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 110 includes one or more processing units 402 (e.g., microprocessors, ASICs, FPGAs, GPUs, CPUs, processing cores, or the like), one or more input/output (I/O) devices and sensors 606, one or more communication interfaces 608 (e.g., USB, FIRE-WIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 410, one or more displays 412, one or more interior or exterior facing image sensor systems 414, a memory 420, and one or more communication buses 404 for interconnecting these and various other components.

In some implementations, the one or more communication buses 404 include circuitry that interconnects and controls communications between system components. In some implementations, the one or more I/O devices and sensors 406 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 412 are configured to present a CGR experience to the user. In some implementations, the one or more displays 412 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 412 correspond to diffractive, reflective, polarized, holographic, etc. waveguide displays. For example, the device 110 includes a single display. In another example, the device 110 includes a display for each eye of the user.

In some implementations, the one or more image sensor systems 414 are configured to obtain image data that corresponds to at least a portion of the face of the user that includes the eyes of the user. For example, the one or more image sensor systems 414 include one or more RGB camera (e.g., with a complimentary metal-oxide-semiconductor (CMOS) image sensor or a charge-coupled device (CCD) image sensor), monochrome camera, IR camera, event-based camera, or the like. In various implementations, the one or more image sensor systems 414 further include illumination sources that emit light upon the portion of the face of the user, such as a flash or a glint source.

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium. In some implementations, the memory 420 or the non-transitory computer readable storage medium of the memory 420 stores the following programs, modules and data structures, or a subset thereof including an optional operating system 430 and a CGR experience module 440.

The operating system 430 includes procedures for handling various basic system services and for performing hardware dependent tasks. In some implementations, the CGR experience module 440 is configured to create, edit, or experience CGR experiences. The FOV unit 442 is configured to determine a FOV that is used as part of the CGR experience. The display characteristic adjustment unit 444 is configured to adjust one or more display characteristics based on the field of view and a determination that the FOV will provided a clipped appearance of one or more virtual objects. Although these modules and units are shown as residing on a single device (e.g., device 110), it should be understood that in other implementations, any combination of these modules and units may be located in separate computing devices.

Moreover, FIG. 4 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 5:
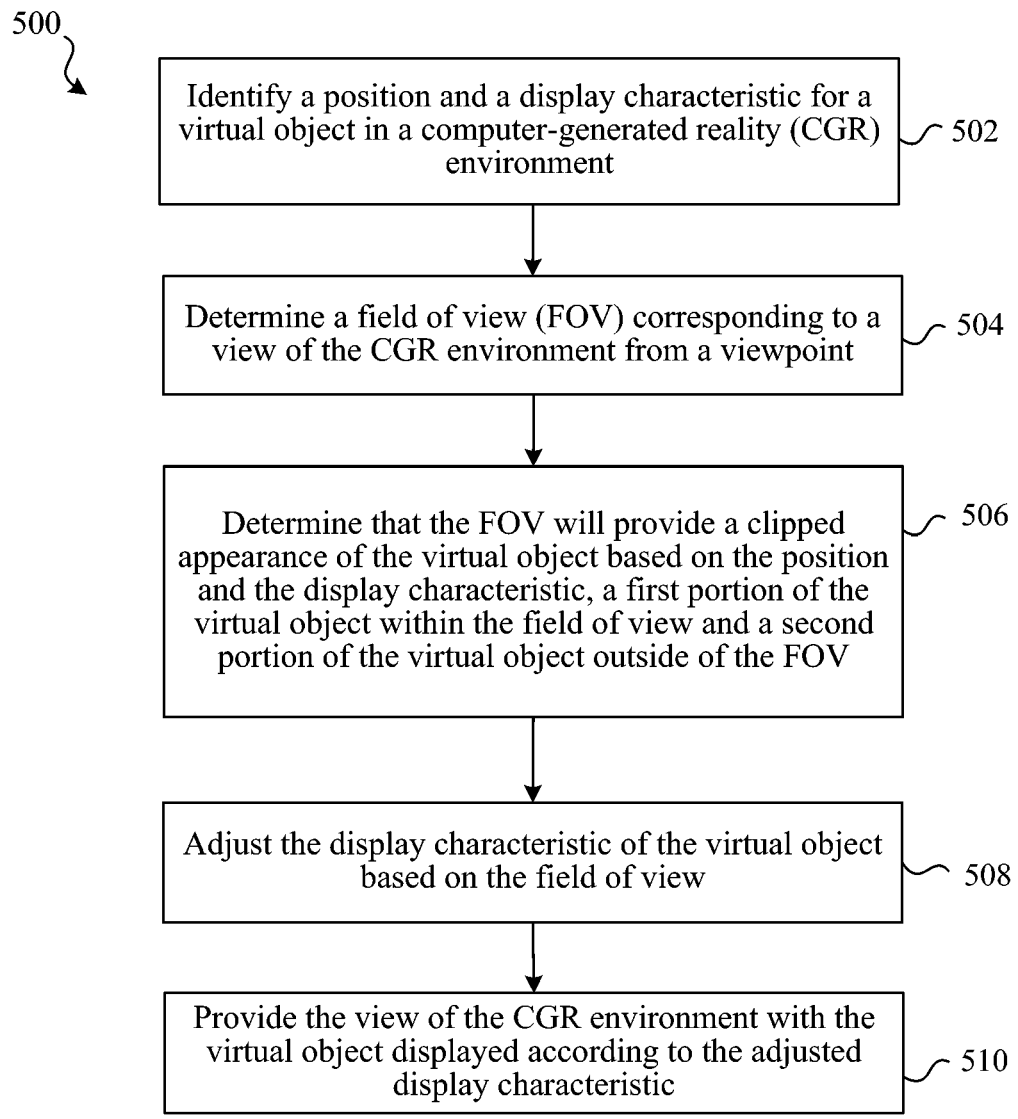
FIG. 5 is a flowchart illustrating an exemplary method of providing a view of a CGR environment, according to some implementations.

FIG. 5 is a flowchart illustrating an exemplary method of providing a view of a CGR environment, according to some implementations. In some implementations, the method 500 is performed by a device (e.g., device 110 of FIGS. 1-4). The method 500 can be performed at a mobile device, handheld device, HMD, desktop, laptop, server device, or by multiple devices in communication with one another. In some implementations, the method 500 is performed by processing logic, including hardware, firmware, software, or a combination thereof. In some implementations, the method 500 is performed by a processor executing code stored in a non-transitory computer-readable medium (e.g., a memory).

At block 502, the method 500 identifies a position and a display characteristic for a virtual object in a CGR environment. In one example, the display characteristic is collected based on a user input or selection and, in another example, the display characteristic is automatically collected by the device. In some implementations, the method 500 classifies the virtual object based on a feature associated with the virtual object that is detected by the method 500. In one example, the virtual object is categorized based on a coarse recognition of any one or combination of features including shape, color, size, volume, markers, type, etc.

At block 504, the method 500 determines an FOV corresponding to a view of the CGR environment from a viewpoint. In one example, the view is determined instantaneously and, in another example, the view is determined predictively based on motion of the user or device. Moreover, in another example, a particular position of the FOV is identified as containing the virtual object.

At block 506, the method 500 determines that the FOV will provide a clipped appearance of the virtual object based on the position and the display characteristic, a first portion of the virtual object within the FOV and a second portion of the virtual object outside of the FOV.

At block 508, the method 500 adjusts the display characteristic of the virtual object based on the determined FOV. In one example, the method 500 adjusts the scale or magnitude of the virtual object so that the virtual object fits entirely in the determined FOV. In another example, the method 500 adjusts the display characteristic of the virtual object from a first state to a second state (e.g., an icon or app logo). In other examples, the method 500 adjusts a display characteristic associated with a portion of the virtual object that would otherwise fall outside of the FOV (e.g., dematerialization or polygon flipping of a portion of the virtual object).

At block 510, the method 500 provides the view of the CGR environment with the virtual object displayed according to the adjusted display characteristic. In one example, the method 500 changes the depiction of the virtual object based on an adjustment of the scale or magnitude of the virtual object so that the virtual object fits entirely in the determined FOV (e.g., anchoring an edge of a minimized virtual object to a position of the FOV). In another example, the method 500 changes the depiction of the virtual object from a first state to a second state (e.g., an icon or app logo). In other examples, the method 500 changes the depiction of a portion of the virtual object that would otherwise fall outside of the FOV (e.g., dematerialization or polygon flipping of a portion of the virtual object).

Figure 6:
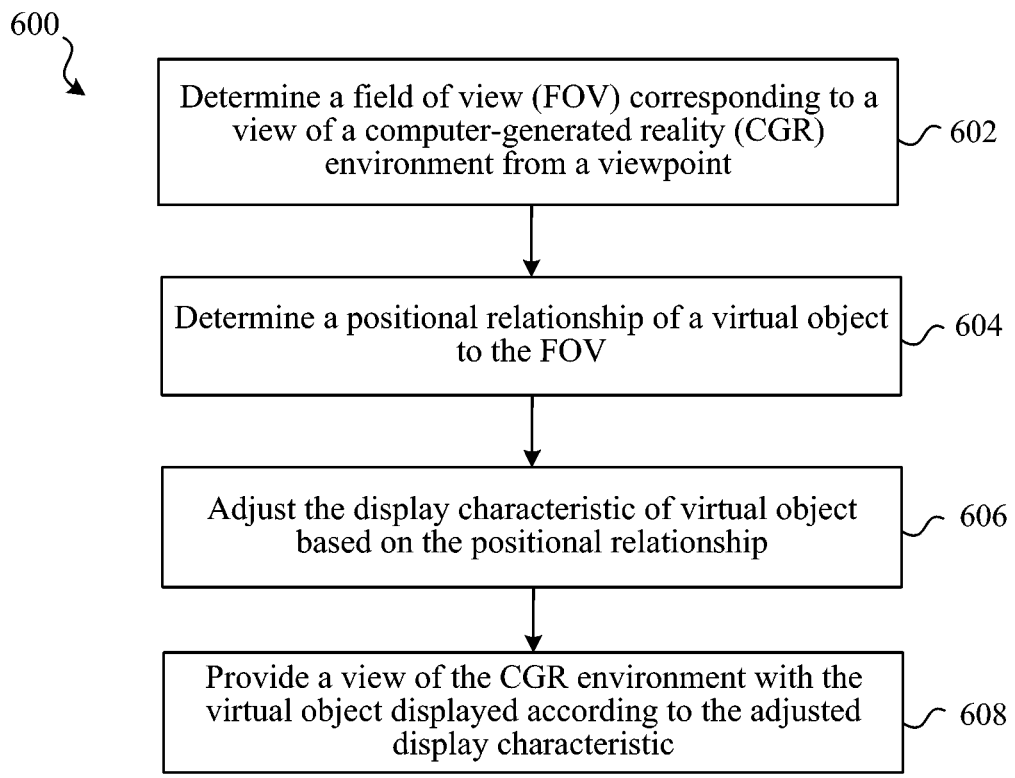
FIG. 6 is a flowchart illustrating an exemplary method of providing a view of a CGR environment, according to some implementations.

FIG. 6 is a flowchart illustrating an exemplary method of providing a view of a CGR environment, according to some implementations. In some implementations, the method 600 is performed by a device (e.g., device 110 of FIGS. 1-4). The method 600 can be performed at a mobile device, handheld device, HMD, desktop, laptop, server device, or by multiple devices in communication with one another. In some implementations, the method 600 is performed by processing logic, including hardware, firmware, software, or a combination thereof. In some implementations, the method 600 is performed by a processor executing code stored in a non-transitory computer-readable medium (e.g., a memory).

At block 602, the method 600 determines an FOV corresponding to a view of the CGR environment from a viewpoint. In one example, the view is determined instantaneously and, in another example, the view is determined predictively based on motion of the user or device. Moreover, in another example, a particular position of the FOV is identified as containing the virtual object.

At block 604, the method 600 identifies a positional relationship of a virtual object to the determined FOV. In one example, the method 600 compares a boundary of the virtual object to a boundary of the FOV. In another example, the method 600 determines than an edge of the virtual object will intersect an edge of the FOV.

At block 606, the method 600 adjusts the display characteristic of the virtual object based on the determined positional relationship. In one example, the method 600 adjusts the scale or magnitude of the virtual object so that the virtual object fits entirely in the determined FOV. In another example, the method 600 adjusts the display characteristic of the virtual object from a first state to a second state (e.g., an icon or app logo). In other examples, the method 600 adjusts a display characteristic associated with a portion of the virtual object that would otherwise fall outside of the FOV (e.g., dematerialization or polygon flipping of a portion of the virtual object).

At block 608, the method 600 provides the view of the CGR environment with the virtual object displayed according to the adjusted display characteristic. In one example, the method 600 changes the depiction of the virtual object by based on an adjustment of the scale or magnitude of the virtual object so that the virtual object fits entirely in the determined FOV (e.g., anchoring an edge of a minimized virtual object to a position of the FOV). In another example, the method 600 changes the depiction of the virtual object from a first state to a second state (e.g., an icon or app logo). In other examples, the method 600 changes the depiction of a portion of the virtual object that would otherwise fall outside of the FOV (e.g., dematerialization or polygon flipping of a portion of the virtual object).

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor:
   presenting, via one or more displays, a virtual object having a display characteristic and with a first positional relationship to a field of view of the one or more displays; and
   in accordance with a determination to present the virtual object with a second positional relationship to the field of view:
   determining an updated display characteristic based on the second positional relationship to the field of view; and
   presenting, via the one or more displays, the virtual object having the updated display characteristic and with the second positional relationship to the field of view.

2. The method of claim 1, wherein the second positional relationship provides a clipped appearance of the virtual object, wherein an edge of the field of view will intersect the virtual object.

3. The method of claim 1, wherein the field of view is determined based on a property of the one or more displays upon which the view is provided.

4. The method of claim 1, wherein the updated display characteristic corresponds to a state in which the virtual object is displayed as an icon or application logo.

5. The method of claim 1, wherein the updated display characteristic corresponds to a resizing of the virtual object to avoid a clipped appearance of the virtual object.

6. The method of claim 1 further comprising:
   providing a transition effect during a time period during which the virtual object transitions from having the display characteristic to having the updated display characteristic.

7. The method of claim 6, wherein the transition effect gradually changes translucency of the virtual object during the time period.

8. The method of claim 6, wherein the transition effect gradually changes a size of the virtual object during the time period.

9. The method of claim 6, wherein the transition effect gradually changes a state of the virtual object during the time period.

10. A system comprising:
    a device with a processor and a computer-readable storage medium comprising instructions that upon execution by the processor cause the system to perform operations, the operations comprising:
    presenting, via one or more displays, a virtual object having a display characteristic and with a first positional relationship to a field of view of the one or more displays; and
    in accordance with a determination to present the virtual object with a second positional relationship to the field of view:
    determining an updated display characteristic based on the second positional relationship to the field of view; and
    presenting, via the one or more displays, the virtual object having the updated display characteristic and with the second positional relationship to the field of view.

11. The system of claim 10, wherein the second positional relationship provides a clipped appearance of the virtual object, wherein an edge of the field of view will intersect the virtual object.

12. The system of claim 10, wherein the field of view is determined based on a property of the one or more displays upon which the view is provided.

13. The system of claim 10, wherein the updated display characteristic corresponds to a state in which the virtual object is displayed as an icon or application logo.

14. The system of claim 10, wherein the updated display characteristic corresponds to a resizing of the virtual object to avoid a clipped appearance of the virtual object.

15. The system of claim 10, wherein the operations further comprise:

provides a transition effect during a time period during which the virtual object transitions from having the display characteristic to having the updated display characteristic.

16. The system of claim 15, wherein the transition effect gradually changes translucency of the virtual object during the time period.

17. The system of claim 15, wherein the transition effect gradually changes a size of the virtual object during the time period.

18. The system of claim 15, wherein the transition effect gradually changes a state of the virtual object during the time period.

19. A non-transitory computer-readable storage medium storing program instructions that are computer-executable to perform operations comprising:

presenting, via one or more displays, a virtual object having a display characteristic and with a first positional relationship to a field of view of the one or more displays; and in accordance with a determination to present the virtual object with a second positional relationship to the field of view:

determining an updated display characteristic based on the second positional relationship to the field of view; and presenting, via the one or more displays, the virtual object having the updated display characteristic and with the second positional relationship to the field of view.

20. The non-transitory computer-readable storage medium of claim 19, wherein the second positional relationship provides a clipped appearance of the virtual object, wherein an edge of the field of view will intersect the virtual object.

* * * * *